Jan. 14, 1958 H. H. ABBOTT 2,820,100
STATION IDENTIFICATION DEVICE
Filed Feb. 26, 1954
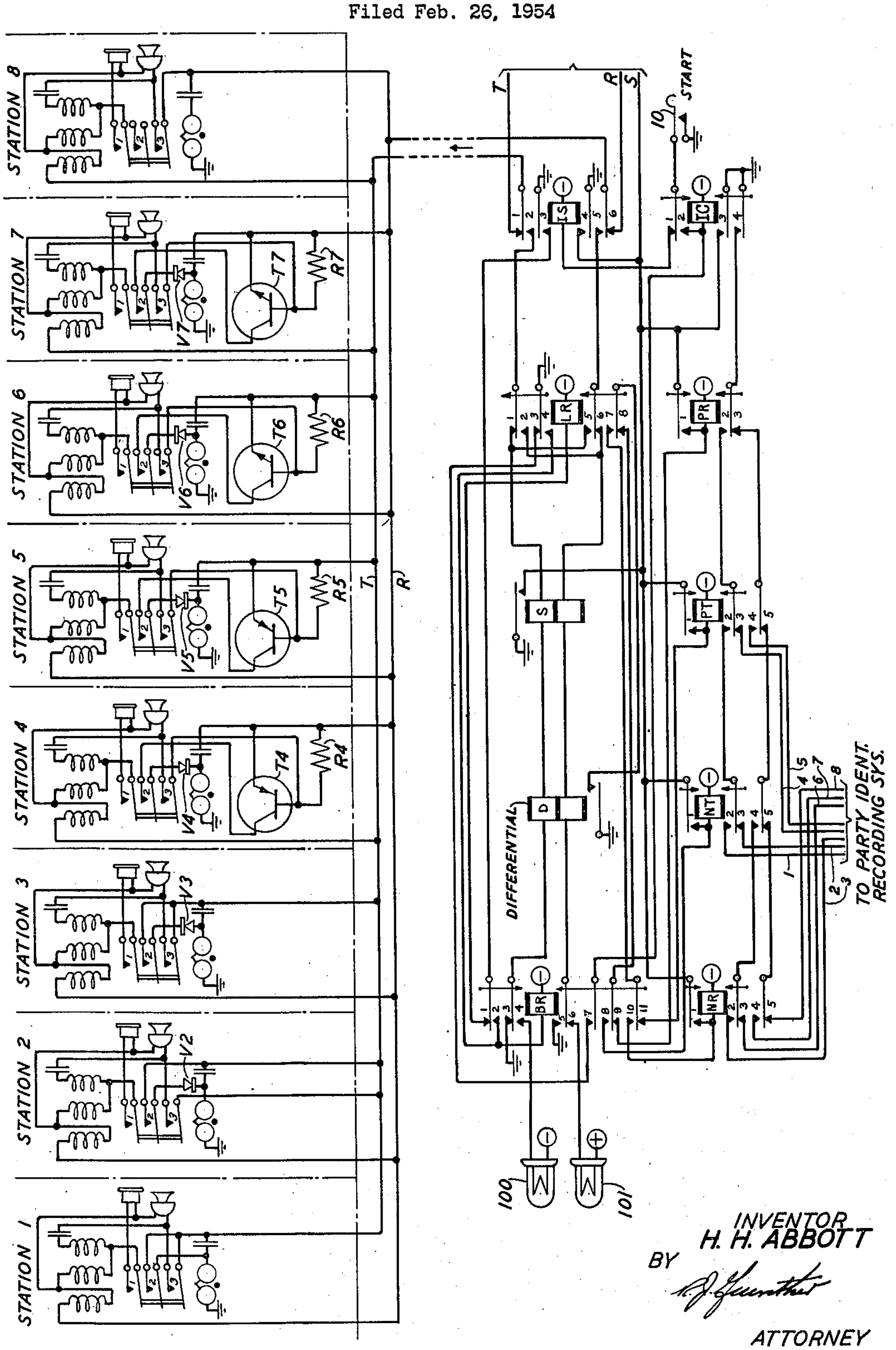
INVENTOR
H. H. ABBOTT
BY
[signature]
ATTORNEY United States Patent Office 2,820,100
Patented Jan. 14, 1958

2,820,100

STATION IDENTIFICATION DEVICE

Henry H. Abbott, Yonkers, N. Y., assignor to Bell Telephone Laboratories, Incorporated, New York, N. Y., a corporation of New York Application February 26, 1954, Serial No. 412,805

13 Claims. (Cl. 179—17)

This invention relates to telephone systems and more particularly to the identification of calling stations on a multiparty line.

The problem of identifying the calling station on a multiparty line is increased by the inclusion of a greater number of stations on the line and by the use of various forms of automatic ticketing devices. In telephone systems using an automatic ticketing device, it is important that the calling station be identified correctly, that the identification be completed with rapidity, and that the identification be done in an economical manner. In order that a station identification system be economical in operation, the circuit elements at the station necessary for this identification must be economical because of the greater numerical requirements than elements at the central station. It is also desirable that any central station apparatus necessary for station identification be connectable to a multitude of telephone lines.

It is necessary to have auxiliary circuit elements at the station in any station identification system wherein the party line has over four parties connected thereto inasmuch as two conductors and a ground return cannot maintain a speech path.

Objects of this invention are to provide a positive and reliable identification of the calling station on a party line, this positive and reliable identification being effected by testing systems in the most economical manner, to simplify the necessary equipment for this testing, to enable such systems to identify an increased number of stations, and to otherwise improve systems of this character.

According to this invention, on a multiparty line, a rectifier is provided at each of a plurality of stations on the line, a transistor is provided at each of some of this plurality of stations, and some of the stations are provided with neither transistors nor rectifiers. The operation of the system is dependent upon the alternate application of positive and negative potentials to the conductors of the line and the detection of a direct-current path to ground at the calling station by equipment at the central station. The station circuits are so designed with transistors and/or rectifiers or the absence thereof that direct-current paths to ground at the various stations exist only with certain potentials or combination of potentials applied to the conductors of the line, and then only if the handset is removed from the mounting.

A switching arrangement at the central station provides selective paths for the positive and negative potentials so that these potentials alternately appear on the tip and the ring sides of the party line. The identification of the calling station comprises the detection of the presence or absence of a direct-current path to ground at the calling station with the various combinations of electrical potential applied to the party line as described above. The detection device is a switching arrangement permitting the accurate identification of the calling station.

A feature of the invention is an arrangement for the identification of the calling station by the selective use of transistors.

Another feature of the invention pertains to the use of rectifiers at each of several of the stations to provide additional restrictive control in the directional flow of the current.

A further feature of the invention is the economy of the means of identification utilized in the circuits.

One multistation telephone line illustrative of this invention comprises eight stations and the invention resides primarily in the means for identifying the calling station and the arrangement of current controlling devices at the calling station. The system for identifying the calling station comprises means at the central office for detecting the presence or absence of a connection from line to ground at the stations under four successive electrical conditions of the line. The four successive electrical conditions are positive battery on the ring side of the line with ground on the tip side of the line; positive battery on the tip side of the line with ground on the ring side of the line; negative battery on the ring side of the line with ground on the tip side of the line; negative battery on the tip side of the line with ground on the ring side of the line. The individual stations are then identified by a combination of circuits for detecting and recording whether direct-current paths to ground exist through varied circuits for directionally controlling current flow at the calling station under the electrical conditions enumerated. The results of the operation of the detection means are utilized to operate identifying means which accurately identify one of the plurality of stations as being the calling station.

The invention is illustrated in the accompanying drawing in which the single figure depicts a party line comprising eight stations terminating at the central station in the identification system. The identification system shown includes means for performing the identification tests and for selectively identifying the calling station. The stations, as shown in the drawing, include the necessary current controlling devices.

In accordance with the invention the four successive electrical test conditions are imposed on the line in a fixed sequence. The complete operation of the system for each test condition will be set forth in the description before the succeeding test conditions are described.

The stations described hereinafter have typical telephone instruments, each comprising a ringing device, receiver, transmitter, switchhooks, and a condenser to isolate the voice currents from ground. In addition, some of the telephone instruments have auxiliary circuit elements mentioned as necessary hereinbefore. These auxiliary circuit elements comprise transistors and varistors, the varistors being of the unsymmetrical class as copper oxide rectifiers or selenium rectifiers.

The necessity for identification of a calling station is indicated by electrical conditions on the party line resulting from one station placing his telephone instrument in operation. The electrical conditions actuate an electromechanical device or signal an operator to begin the identification process.

Start switch 10 is then closed connecting ground through the No. 1 contact of the identification complete relay IC through the winding of the identification start relay IS to battery whereby relay IS is operated. Relay IS, in operating, applies ground to the tip conductor T by a circuit including the No. 2 contact of relay IS, the No. 1 contact of relay LR, the winding of relay S, the winding of relay D and the No. 3 contact of relay BR. Relay IS, in operating, applies positive battery to the ring side of the line by a circuit including the No. 5 contact of relay IS, the No. 6 contact of relay LR, the winding of relay S, the winding of relay D, the No. 6 contact of relay BR, the lamp 101 and positive battery. Contact No. 3 of relay IS applies ground through contact No. 1 of relay BR, through the winding of relay LR to battery thereby energizing relay LR, operation of which will be described hereinafter. Operation of relay IS applies ground through its No. 4 contact to the sleeve lead thereby placing a holding ground upon the sleeve lead for such period as relay IS is operated thus enabling one or more of relays PR, PT, NR and NT to be subsequently energized, and in addition providing means for maintaining the registration of dial pulses or other signaling means which may have been registered on associated equipment not a part of this invention.

With positive potential on the ring side of the line a direct-current path to ground may be found at any one of stations 1, 2 or 4 if the handset of that station is off its mounting. If the handset of station 1 is off its mounting a direct-current path to ground will exist at station 1, through the first winding of the coil, through the transmitter, the No. 3 switchhook contact, the No. 2 switchhook contact and then through the ringing device to ground. Station No. 2 will provide a direct-current path to ground at the station, if the switchhook contacts are closed, through the first winding of the coil of station 2, through the transmitter, through the No. 3 switchhook contact, through the No. 2 switchhook contact, through the varistor V2, through the ringing device to ground. The varistors in this invention offer less resistance to current flow in the direction of the arrows as shown in the drawing. If the switchhook contacts are closed at station 4, a direct-current path to ground at that station is traceable through the emitter electrode of transistor T4, the collector electrode of transistor T4, the No. 2 switchhook contact, the varistor V4 and thence through the ringing device to ground. Resistors R4 through R7 are of relatively low impedance to avoid transmission losses while the station is being used on the line. The direct-current path from the ring side of the line to ground at station 4 is directionally controlled by the action of transistor T4. The transistor T4 permits the direct-current flow, as described above, only after it has detected the test condition of the lines wherein there is positive potential on the ring side of the line and ground potential on the tip side of the line. This test condition causes a small current to flow in a circuit comprising the ring side of the line, the emitter electrode of transistor T4, the base electrode of transistor T4, the No. 3 switchhook contact, the transmitter, the first winding of the coil of station 4 and the tip side of the line. This small starter current reduces the normal impedance to the collector of transistor T4 and permits the flow of direct-current to ground at station 4 through the transistor T4 as described above.

With one of these three stations exhibiting a direct-current path to ground at the station, the identifying circuit at the central station will operate in the following manner: The differentially wound relay D will operate due to the direct-current path to ground at the station causing a current flow through one of the windings of relay D which is different from that through its other winding. This upsets its equilibrium. Relay D upon operating connects ground to its No. 1 contact, to the No. 8 contact of relay LR, to the No. 9 contact of relay BR, to the winding of relay PR and thence to battery thereby energizing relay PR. Relay PR operates after a fixed time interval and locks operated with ground applied through its No. 1 contact from the sleeve lead.

Relay LR, of the slow operate type having been energized as described above, now operates. Relay LR in operating applies ground through the No. 3 contact of relay BR, the winding of relay D, the winding of relay S, the No. 5 contact of relay LR, the No. 5 contact of relay IS and thence to the ring side of the line. Positive potential is applied to the tip side of the line through the circuit comprising the No. 2 contact of relay IS, the No. 2 contact of relay LR, the winding of relay S, the winding of relay D, the No. 6 contact of relay BR, lamp 101, and the battery. In operating, relay LR, through its No. 4 contact, applies ground through the winding of relay BR to battery thus energizing relay BR which is of the slow operate type. With positive potential on the tip side of the line, stations 1, 2 and 5 are capable of presenting a direct-current path to ground at the station if the respective handset is removed from its mounting. This direct-current path to ground at the station may be traced at station 1 from the tip side of the line, through the No. 2 switchhook contact, through the ringing device to ground. Station 2 presents a direct-current path to ground from the tip side of the line, through the No. 2 switchhook contact, through the varistor V2, through the ringing device to ground. Station 5 presents a direct-current path from the tip side of the line through the emitter electrode of transistor T5, through the collector electrode of transistor T5, through the No. 2 switchhook contact, through the varistor V5, through the ringing device to ground. The transistor T5 operates in a manner which is identical with that described for transistor T4 at station 4 except that the starter current proceeds from the positive potential on the tip side of the line to ground potential on the ring side of the line.

If one of these stations has the handset removed from its mounting, relay D, which has released and returned to equilibrium during the operation of relay LR, will once again operate. Relay D upon operation places ground through its No. 1 contact, through the No. 7 contact of relay LR, through the No. 11 contact of relay BR, through the winding of relay PT to battery thereby energizing relay PT. Relay PT, of the slow operate type, subsequently operates and locks operated with ground applied through its No. 1 contact from its sleeve lead.

Relay BR, previously energized by operation of relay LR, now operates and connects negative potential through lamp 100, through the No. 4 contact of relay BR, through the winding of relay D, through the winding of relay S, through the No. 5 contact of relay LR, through the No. 5 contact of relay IS, to the ring side of the line. Ground is applied when relay BR operates through the No. 5 contact of relay BR, through the winding of relay D, through the winding of relay S, through the No. 2 contact of relay LR, through the No. 2 contact of relay IS, to the tip side of the line. Ground is removed from the winding of relay LR by the opening of the No. 1 contact of relay BR; thus releasing relay LR. However, relay LR is of the slow release type and the release will not be effected until an adequate time delay has elapsed.

Under this electrical condition, stations 1, 3 and 7 will show direct-current paths to ground at the station if the handset is off the mounting at the respective stations. Station 1 presents a direct-current path to ground, through a circuit comprising the ringing device, the No. 2 switchhook contact, the No. 3 switchhook contact, the transmitter, the coil, and the tip side of the line. Station 3 shows a direct-current path from ground, through the ringing device, through the varistor V3, through the No. 2 switchhook contact, through the No. 3 switchhook contact, through the transmitter, through the coil, to the ring side of the line. Station 7 will have a direct-current path from ground, through the ringing device, through the varistor V7, through the No. 2 switchhook contact, through the collector electrode of transistor T7, through the emitter electrode of transistor T7, to the ring side of the line. The direct-current path from the tip side of the line to ground, at station 7, is directionally controlled by the action of transistor T7. Transistor T7 permits direct-current flow to ground at the station, as shown above, only when negative potential is on the tip side of the line and ground potential is on the ring side of the line. Transistor T7 will detect this condition by the flow of a small starter current in a circuit comprising the tip side of the line, the coil of station 7, the transmitter, the No. 3 switchhook contact, the base electrode of transistor T7, the emitter electrode of transistor T7, and the ring side of the line. This small starter current reduces the normal impedance of transistor T7 to the flow of current from ground at the station to the negative potential on the ring side of the line and permits this flow of current.

If any of these stations has the handset removed from the mounting, thus presenting a direct-current path to ground at the station with negative potential on the tip side of the line, relay D having released and returned to equilibrium during the operation of relay BR once more operates and applies ground through its No. 1 contact, through the No. 7 contact of relay LR, through the No. 10 contact of relay BR, through the winding of relay NR to battery thus energizing relay NR. Relay NR after a fixed time interval locks in operation by the application of ground from the sleeve lead through its No. 1 contact.

Relay LR, being of the slow release type with ground having been removed from its winding as described above, now releases. Relay LR upon releasing applies negative potential through the lamp 100, through the No. 4 contact of relay BR, through the winding of relay D, through the winding of relay S, through the No. 1 contact of relay LR, through the No. 2 contact of relay IS, to the tip side of the line. Ground is applied through the No. 5 contact of relay BR, through the winding of relay D, through the winding of relay S, through the No. 6 contact of relay LR, through the No. 5 contact of relay IS, to the ring side of the line.

With negative potential on the tip side of the line a direct-current path to ground may be found at stations 1, 3 and 6 if the respective handset is removed from its mounting. The direct-current path to ground at station 1 may be traced from ground through the ringing device, through the No. 2 switchhook contact, to the tip side of the line. At station 3 the direct-current path from ground at the station exists through the ringing device, through the varistor V3, through the No. 2 switchhook contact, to the tip side of the line. Station 6 presents a direct-current path from ground at the station through the ringing device, through the varistor V6, through the No. 2 switchhook contact, through the collector electrode of transistor T6, through the emitter electrode of transistor T6, to the tip side of the line. Transistor T6 operates in a manner identical with that described for transistor T7 with the exception that the starter current flows from the ring side of the line, to the tip side of the line through the same circuit elements as described for transistor T7.

If any of these stations has its switchhook contacts closed by virtue of the handset being removed from its mounting, relay D having released upon the release of relay LR will once again operate and connect ground through its No. 1 contact, through the No. 8 contact of relay LR, through the No. 8 contact of relay BR, through the winding of relay NT, to battery thus energizing relay NT. Relay NT operating after a fixed time interval locks operated with ground applied through its No. 1 contact from the sleeve lead to its winding.

The release of relay LR connects ground through the No. 3 contact of relay LR, through the No. 7 contact of relay BR, through the winding of relay IC to battery thus energizing relay IC. Relay IC, of the slow operate type, after an interval of time sufficient to permit relay NT to operate, operates to complete the identification. Relay IC in operating applies ground through its No. 3 contact to the sleeve lead prior to release of ground from the No. 4 contact of relay IS thereby retaining the holding ground upon said sleeve lead for relays PR, PT, NR and NT. Relay IC remains in an operated state by the connection of ground from the start switch 1 to battery through its windings and No. 2 contacts. Contact No. 1 of relay IC breaks, releasing relay IS and removing the identification circuit from connection to the party line.

The identification of the calling station is now complete but representation of the calling station's identification must still be presented to the identification recording system. This representation is the connection of ground to leads which may be connected to a party identification recording system through contact 4 of relay IC and the switching arrangement comprising the various combinations of the contacts of relays PR, PT, NR and NT. It would be possible to use many relay contact combinations in the switching arrangement for identification of the calling station. One such combination is shown in the drawing. Station 1 is identified when a direct-current path to ground at the station resulted upon application of all of the electrical test conditions to the line; station 2 is identified when a direct-current path to ground at the station resulted only with positive potential on either one of the two conductors of the line while ground was on the opposite conductor; station 3 is identified when negative battery on either one of the two conductors of the line, while ground was on the opposite conductor, produced a direct-current path to ground at the station and not under any other condition; station 4 is identified when a direct-current path to ground at the station existed only with positive battery on the ring side of the line and the ground potential on the tip side of the line; station 5 is identified by a direct-current path to ground at the station only with positive battery on the tip side of the line and ground on the ring side of the line; station 6 is identified with a direct-current path to ground at the station existing only with negative battery on the tip side of the line and ground on the ring side of the line; station 7 is identified by a direct-current path to ground at the station existing only with negative battery on the ring side of the line and ground on the tip side of the line; station 8 is identified when none of the electrical conditions imposed on the line produced a direct-current path to ground at the station. Ground is applied over a circuit selected by the operation of relays PR, PT, NR and NT, through the No. 4 contact of relay IC to a station identification recording system, for example registers, in such a manner that ground is related to the lead associated with the identified station.

After the station identification recording system has recorded station identity, the start device circuit is broken, thereby deenergizing relay IC which in turn deenergizes those of relays PR, PT, NR and NT which had been energized, and in so doing returns the identifying system to its initial condition in which it is ready to make subsequent identifications.

What is claimed is:

1. In a telephone system, a line comprising two conductors and having a plurality of stations connected thereto, means at some of said plurality of stations to directionally control direct-current flow between said conductors and ground thereat, sources of potential of opposite polarities, means for successively applying each of said sources of potential individually to each of said conductors, means for detecting direct-current flow at said stations, and means controlled by said detecting means for identifying the stations on said line.

2. In a telephone system, a line comprising two conductors and having a plurality of stations connected thereto, means comprising a unidirectional current flow device coupled to one of said lines at certain of said stations, sources of potential of opposite polarities, means for successively applying said sources of potential individually to each of said conductors, means for detecting direct-current flow at said stations, and means controlled by said detecting means for identifying the stations on said line.

3. In a telephone system, a central station, a line comprising two conductors and having a plurality of stations connected thereto, means at each of some of said stations comprising an asymmetrical current control device, a second current control device at certain of said some of said stations, means for activating said second current control devices, means for controlling said activating means, means connecting both current control devices in series individually at each station, sources of potential of opposite polarities, means for successively applying each of said sources of potential individually to each of said conductors, means at said central station for detecting direct-current flow at said stations, and means controlled by said detecting means for identifying the stations on said line.

4. In a telephone system, a central station, a line comprising two conductors and having a plurality of stations connected thereto, means at each of some of said stations comprising an asymmetrical current control device, a second current control device at certain of said some of said stations normally presenting high impedance to the flow of current but when activated controlling the flow of current by presenting high impedance to the flow of current in one direction and presenting low impedance to the flow of current in the opposite direction, means for activating said second current control devices, means for controlling said activating means, means connecting both current control devices in series individually at each station, sources of potential of opposite polarities, means for successively applying each of said sources of potential individually to each of said conductors, means at said central station for detecting direct-current flow at said stations, and means controlled by said detecting means for identifying the stations on said line.

5. In a telephone system, a central station, a line comprising two conductors and having a plurality of stations connected thereto, means at each of some of said stations comprising an asymmetrical current control device, a transistor having an emitter electrode, a base electrode, a collector electrode and semiconductive material at certain of said some of said stations normally presenting high impedance to the flow of current but when activated controlling the flow of current by presenting high impedance to the flow of current in one direction and presenting low impedance to the flow of current in the opposite direction, polarity sensitive circuit means comprising the base electrode, emitter electrode, the semiconductive material, said stations and said conductors, means for activating said transistors controlled by said circuit means, means connecting in series the collector electrode of said transistor and said asymmetrical current control device individually at each station, sources of potential of opposite polarities, means for successively applying each of said sources of potential individually to each of said conductors, means at said central station for detecting direct-current flow at said stations, and means controlled by said detecting means for identifying the stations on said line.

6. In a telephone system, a central station, a line comprising two conductors and having a plurality of stations connected thereto, means at each of some of said stations comprising an asymmetrical current control device, a transistor having an emitter electrode, a base electrode, a collector electrode and semiconductive material at certain of said some of said stations normally presenting high impedance to the flow of current but when activated controlling the flow of current by presenting high impedance to the flow of current in one direction and presenting low impedance to the flow of current in the opposite direction, polarity sensitive circuit means comprising the base electrode, emitter electrode, semiconductive material, said stations and said conductors, activating means comprising the emitter electrode, base electrode, and semiconductive material of said transistors, said activating means controlled by said circuit means, means connecting said asymmetrical current control device in series with the collector electrode of said transistor individually at each station, sources of potential of opposite polarities, relay means for successively applying each of said sources of potential individually to each of said conductors, relay means at said central station for detecting direct-current flow to ground at said stations, and relay means controlled by said last-mentioned detecting means for identifying the stations on said line.

7. In a telephone system, a central station, a line comprising two conductors and having a plurality of stations connected thereto, means at each of some of said stations comprising an asymmetrical current control device, means at all of said stations comprising switchhook contacts having a normal idle position and an operated position, each said switch when in an operated position connects said station to said conductors, each said switch connects, when in an operated position, said asymmetrical current control device between ground at the station and said conductors of said line, a transistor having an emitter electrode, a base electrode, a collector electrode and semiconductive material at certain of said some of said stations normally presenting high impedance to the flow of current but when activated controlling the flow of current by presenting high impedance to the flow of current in one direction and presenting low impedance to the flow of current in the opposite direction, polarity sensitive circuit means comprising the base electrode, emitter electrode, semiconductive material, said stations and said conductors, activating means comprising the emitter electrode, base electrode, and semiconductive material of said transistors, said activating means controlled by said circuit means, said switches connect when in an operated position said circuit means to said conductors, means connecting said asymmetrical current control device in series with the collector electrode of said transistor individually at each station, sources of potential of opposite polarities, means at said central station comprising an identification starter, means at said central station comprising a system of circuit controllers actuated by said starter for successively applying each of said sources of potential individually to each of said conductors, circuit means comprising a differentially wound relay, said line, said sources of potential and said stations for detecting direct-current flow at said stations, relay means energized by said detecting means for successively upon each sequential application of said potentials first identifying less than all of said stations at which direct current flows, and then less than all of said identified number at which direct current flows and so on successively to only one of said stations on said line, and means operated by said last sequential application of said potentials to energize a conductor distinctively identifying said one of said stations.

8. In a telephone system, a central station, a line comprising two conductors and having a maximum plurality of eight outlying stations connected thereto, each of said stations having a call-in switch having a normal idle position and an operated position, some of said stations having an asymmetrical current control device, some of said stations having two asymmetrical current control devices connected in series with each other, one of said asymmetrical current control devices normally having a high impedance but actuated by current flow between said conductors of said line when said conductors have specified potentials applied thereto, means at said central station comprising an identification starter, a system of circuit controllers actuated by said starter to apply positive and negative voltage in sequence to each of said conductors and simultaneously to apply ground to the opposite conductor, means comprising a series of relays for successively upon each sequential application of potential to said conductors identifying the stations at which current flows to ground at said stations during each application of potential, said identifying procedure being repeated successively until only one of said stations is identified, and means operated by said last sequential application to energize a conductor whereby one of said stations is distinctively identified.

9. In a communication system, a central office, a two conductor line extending from said office to each of eight outlying stations, each of said stations having a calling-in switch having a normal idle position and an operated position, each said switch, when in operated position establishing none, one, or two paths to ground from said conductors at its respective station, certain of said paths being of high impedance to current in one direction and negligible impedance in the other direction, means at said central office comprising an identificaiton starter, a system of circuit controllers actuated by said starter to apply positive and negative voltage in sequence to each of said conductors, means for successively upon each sequential application first identifying less than all of said outlying stations at which said switch may be in operated position, and then less than all of said identified number and so on successively to one only of said stations, and means operated by said last sequential application to energize a conductor distinctively identifying said one of said stations.

10. In a telephone system, a line comprising two conductors and having a plurality of stations connected thereto, means at some of the stations to directionally control direct-current flow thereat, sources of potential of opposite polarities, means comprising relays for successively applying each of said sources of potential individually to each of said conductors, a differentially wound relay in a circuit comprising said line, said sources of potential and said stations for detecting direct-current flow at said stations, and means controlled by said detecting means for identifying the stations on said line.

11. In a telephone system, a line comprising two conductors and having a plurality of stations connected thereto, means at some of the stations to directionally control direct-current flow thereat, sources of potential of opposite polarities, a switch, a plurality of relays controlled by said switch, means for operating and releasing said relays sequentially to successively connect each of said sources of potential individually to each of said conductors, a differentially wound relay in a circuit comprising said line, said sources of potential and said stations for detecting direct-current flow at said stations, and means controlled by said detecting means for identifying the stations on said line.

12. In a telephone system, a line comprising two conductors and having a plurality of stations connected thereto, means at some of the stations to directionally control direct-current flow thereat, sources of potential of opposite polarities, a switch, a plurality of relays controlled by said switch, means for operating and releasing said relays sequentially to successively connect each of said sources of potential individually to each of said conductors, means including a differentially wound relay arranged in a circuit comprising said line, said sources of potential and said stations for detecting direct-current flow at said stations for each application of said sources of potential to said line, and means controlled by said detecting means for identifying the stations on said line.

13. In a telephone system, a line comprising two conductors and having a plurality of stations connected thereto, means at some of the stations to directionally control direct-current flow thereat, sources of potential of opposite polarities, a switch, a plurality of relays controlled by said switch, means for operating and releasing said relays sequentially to successively connect each of said sources of potential individually to each of said conductors, means including a differentially wound relay arranged in a circuit comprising said line, said sources of potential and said stations for detecting direct-current flow at said stations for each application of said sources of potential to said line, a plurality of relays successively energized and controlled by said differential relay for identifying the stations on said line.

References Cited in the file of this patent

UNITED STATES PATENTS

| | | |
|---|---|---|
| 1,663,747 | Bascom | Mar. 27, 1928 |
| 1,804,767 | Hague | May 12, 1931 |
| 1,831,385 | Hague | Nov. 10, 1931 |
| 1,841,084 | Bragg | Jan. 12, 1932 |
| 2,523,657 | Gordon | Sept. 26, 1950 |
| 2,524,773 | Deakin | Oct. 10, 1950 |
| 2,550,585 | Murphy | Apr. 24, 1951 |
| 2,615,094 | Mitchell | Oct. 21, 1952 |